United States Patent [19]
Noyes

[11] Patent Number: 6,044,883
[45] Date of Patent: Apr. 4, 2000

[54] RETRACTABLE ANTI-SKID TREAD FOR DUAL TIRE VEHICLES

[76] Inventor: Paul C. Noyes, 31327 10th Pl. SW., Federal Way, Wash. 98023

[21] Appl. No.: 09/020,083

[22] Filed: Feb. 6, 1998

[51] Int. Cl.[7] ................................................ B60C 27/00
[52] U.S. Cl. .......................................... 152/210; 152/218
[58] Field of Search .................................... 152/208, 220, 152/415, 218; 301/52, 36.1, 36.3, 43, 44.3, 44.4, 45, 46, 48

[56] References Cited

U.S. PATENT DOCUMENTS

| | | | |
|---|---|---|---|
| 2,201,632 | 5/1940 | Roessel | 152/216 |
| 2,480,548 | 8/1949 | Carhart | 152/208 |
| 2,491,491 | 12/1949 | Freygang | 152/331 |
| 2,672,908 | 3/1954 | Donegan | 152/208 |
| 2,708,470 | 5/1955 | Gramelspacher | 152/208 |
| 2,781,813 | 5/1957 | Ferguson | 152/208 |
| 2,835,302 | 5/1958 | Gedge | 152/208 |
| 2,841,199 | 7/1958 | Voelkel et al. | 152/208 |
| 2,888,056 | 5/1959 | Zahlten | 152/208 |
| 2,941,566 | 6/1960 | Prince | 152/208 |
| 3,095,918 | 7/1963 | Mike | 152/208 |
| 3,340,921 | 9/1967 | Garfinkle | 152/208 |
| 3,516,466 | 6/1970 | Smit | 152/208 |
| 3,712,358 | 1/1973 | Einarsson | 152/208 |
| 3,766,956 | 10/1973 | Ruane et al. | 152/208 |
| 3,942,572 | 3/1976 | Crandall | 152/208 |
| 4,676,289 | 6/1987 | Yi Su | 152/210 |
| 4,815,513 | 3/1989 | Hirakawa | 152/210 |
| 5,398,742 | 3/1995 | Takebayashi | 152/208 |
| 5,411,070 | 5/1995 | Yadegar | 152/210 |

FOREIGN PATENT DOCUMENTS

| | | |
|---|---|---|
| 198148 | 6/1958 | Austria . |

*Primary Examiner*—Francis J. Lorin
*Attorney, Agent, or Firm*—R. Reams Goodloe, Jr.

[57] ABSTRACT

An anti-skid device. The device is installed between tire pairs in vehicles using dual tires in wheel assemblies. The device increases friction between the wheeled vehicle and a slippery surface therebelow. Each of the two or more dual tire type wheel assemblies has a wheel having a central axis of rotation, a first tire, and a second tire. The first and second tire are mounted to the wheel in a spaced apart relationship along the axis of rotation, to provide therebetween a centrally located mounting space which is located radially outward from the central axis of rotation. The anti-skid device is placed in the mounting space between the first tire and the second tire. The anti-skid device includes, in radially outward order, a retainer ring, a spacer ring, an inflation ring (preferably pneumaticaly inflatable), and an anti-skid tread ring. The anti-skid tread ring is displaceable outward by inflation of the inflation ring, so as to engage the slippery surface with tread lugs or studs. The device may be manually, remotely, or automatically activated to inflate and deflate the inflation ring for engagement to or disengagement from a slippery surface therebelow.

37 Claims, 8 Drawing Sheets

RETRACTABLE ANTI-SKID TREAD FOR DUAL TIRE VEHICLES

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

This patent application is related to Disclosure Document Number 405,368 filed on Sep. 16, 1996.

FIELD OF THE INVENTION

My invention relates to a retractable anti-skid tread device for increasing the traction of a tire on slippery surface such as snow or ice, and more particularly to a novel, improved apparatus which may be inflated and deflated to engage anti-skid tread with the surface, as deemed advisable based on existing roadway conditions.

BACKGROUND

It is often desirable to drive vehicles over slippery, snow or ice covered roadways. Dual wheels require the installation of heavy chains when such conditions are encountered. A typical vehicle where such dual wheels are prevalently used might be in commercial or governmental vehicles such as large trucks or buses. However, such dual wheel configurations are increasingly utilized in private vehicles, such as large pickups or sport utility vehicles, and their use may be expected to expand even more widely in the future.

When "chain-up" conditions are encountered, the labor involved in the installation and removal of required chains is considerable. Many hours are consumed by drivers and support personnel to equip vehicles for operation in such adverse conditions. Moreover, the mere hassle of dealing with such equipment tempts some drivers to press on without installing chains, particularly in precautionary situations, and this often results in accidents with property damage and/or personal injury.

I am aware of various attempts in which an effort has been made to provide an improved, retractable studded tire, or to add a friction increasing device to a dual tire. In single width tires, such attempts are largely characterized by designs which include some sort of inflatable chamber which extends studs outward toward a road surface, from a stowed position where the studs have minimal or no contact with the road surface. Such extendible stud designs do not lend themselves to traction devices or treads other than studs.

In dual width wheels, complicated mechanical devices have been employed, or fixed inserts with inflatable studs have been employed. None of those designs have been wholly satisfactory, primarily because they require additional parts that are relatively foreign to the tire industry, and which parts are prone to breakage (under conditions in which they are not easily repaired).

One such prior art design is shown in Austrian Patentschrift Nr. 198148, issued Jun. 10, 1958. In one embodiment, his invention provides a radially extending tread portion which is mechanically affixed to a in inverted "T" post that is secured between the two wheels. However, his device does not provide for a simple, tread retraction when the extra traction is not necessary, rather, only the stud is pneumatically inflated and released.

Another design which superficially attempts to solve the same problem as the instant invention, at least to some remote extent, is disclosed in U.S. Pat. No. 2,201,632 issued May 21, 1940 to L. O. E. Roessel for ANTISKIDDING DEVICE FOR AUTOMOBILES. Roessel's design uses a mechanical geared device, with extendable radially extending spokes having at their distal end a claw foot device. These devices are placed between a pair of tires in a dual wheel assembly.

For the most part, the documents identified in the preceding paragraphs disclose devices which require the mechanical fasteners or mechanical adjustment to position the tread device. Roessel's device, having various adjustable parts, suffers from the shortcomings that they may become broken in use, thus resulting in the danger of reduced traction. And, although the Austrian patent shows a solid tread design with inflatable stud, the tread is basically fixed against the roadway whenever the device is employed, rather than being retractable, or cushioned against impact. Thus, the advantages of (a) my simple retainer ring design which may be used in wheels of conventional design with minimal modifications, (b) which enables dual tires to function normally when my retractable tread assembly is not installed, and (c) the avoidance of mechanical fasteners and mechanical gears, etc., as a means to engage the tread studs with the roadway, are important and self-evident.

Objects, Advantages, and Novel Features

I have now invented, and disclose herein, a novel, design for a dual tired retractable tread stud device, which does not have the above-discussed drawbacks common to those somewhat similar products heretofore designed or used of which I am aware. Unlike the earlier designs which attempted to provide retractable tread studs, for use in automotive applications, my product is adapted to being extended and retracted without resorting to mechanical fasteners and geared, mechanically extendable parts. Further, it is simple, sturdy, relatively inexpensive and easy to manufacture, and otherwise superior to those designs heretofore used or proposed. In addition, it provides a significant, additional measure of safety in dual tired vehicles, without the necessity of resorting to installation of chains, when slippery road surface conditions are encountered.

From the foregoing, it will be apparent to the reader that one important and primary object of the present invention resides in the provision of a novel apparatus for providing a retractable anti-skid tread on dual tire vehicles, which simplifies the installation of such a retractable anti-skid tread device, and which improves the simplicity, resilience, maintenance costs, and safety of such devices by reducing or eliminating reliance on mechanical fasteners or geared extendible parts.

Other important but more specific objects of the invention reside in the provision of a retractable, traction increasing, anti-skid device for dual tired vehicles, as described herein which:

can be manufactured in a simple, straightforward manner of commonly available materials;

in conjunction with the preceding object, have the advantage that they can be easily and quickly installed by the user between dual tires using conventional wheel servicing equipment;

which in a relatively inexpensive manner can reduce labor costs and maintenance costs of equipment utilized in snow and ice conditions, and which enhance safety in the operation of such vehicles, particularly vehicles such as school buses or delivery trucks;

which are suitable for operation in private vehicles such as pickups or sport utility vehicles where dual tires are conveniently installed;

provide a built in back-up spare tire, in that the traction increasing device can be used as a back-up tire tread, enabling the vehicle to continue to travel in spite of underinflation of one or more tires on a dual wheel, effectively eliminating the need for a spare;

reduce the tendency of vehicles using dual rear tires to hydroplane in wet roadway conditions;

have no metallic arms, extension rods, fasteners, or gears to protrude from the wheel, thus avoiding the possibility of tire damage therefrom;

which are easily retracted when the traction tread is not needed, thereby reducing wear and tear on roadway surfaces.

Other important objects, features, and additional advantages of my invention will become apparent to the reader from the foregoing and from the appended claims and the ensuing detailed description, and as the discussion below proceeds in conjunction with examination of the accompanying drawing.

SUMMARY OF THE INVENTION

I have now invented and disclose herein a novel retractable anti-skid tread device for vehicles propelled with dual traction tires on a common wheel assembly. The device may be used in vehicles of any type, whether trucks, buses, as well as personal vehicle such as pickups, sport utility vehicles, or potentially even cars. The apparatus is useful for operation of such vehicles directly on slippery surfaces such a snow or ice covered roadways, without the necessity of providing a separate set of chains. The device advantageously eliminates the need for continuous contact of studded tires with a roadway, since in my device, any traction increasing studs are retractable, thus decreasing wear and tear on roadway surfaces.

My invention involves combining an anti-skid device and a wheeled vehicle for increasing friction between the wheeled vehicle and a slippery surface therebelow. The invention is most applicable to vehicles of the type where two or more tires are mounted on a single wheel assembly; generally this is accomplished in "pairs" of "dual tires" or "dual wheels." Each of the two or more dual tire type wheel assemblies has a wheel having a central axis of rotation, a first tire, and a second tire. The first and second tire are mounted to the wheel in a spaced apart relationship along the axis of rotation, to provide therebetween a centrally located mounting space which is located radially outward from the central axis of rotation.

An anti-skid device, is placed in the mounting space between the first tire and the second tire. The anti-skid device includes, in radially outward order, a retainer ring, a spacer ring, an inflation ring (preferably pneumatically inflatable), and an anti-skid tread ring. The anti-skid tread ring is displaceable outward by inflation of the inflation ring, so as to engage the slippery surface with tread lugs or studs.

My novel retractable anti-skid tread device provides a simple, secure apparatus for enhancing safety when operating dual type tires on vehicles in slippery conditions. My design provides a significant improvement in the art, by reducing complexity and manufacturing costs compared to previous designs known to me for provision of retractable traction increasing devices for vehicles.

DESCRIPTION

Figure 1:
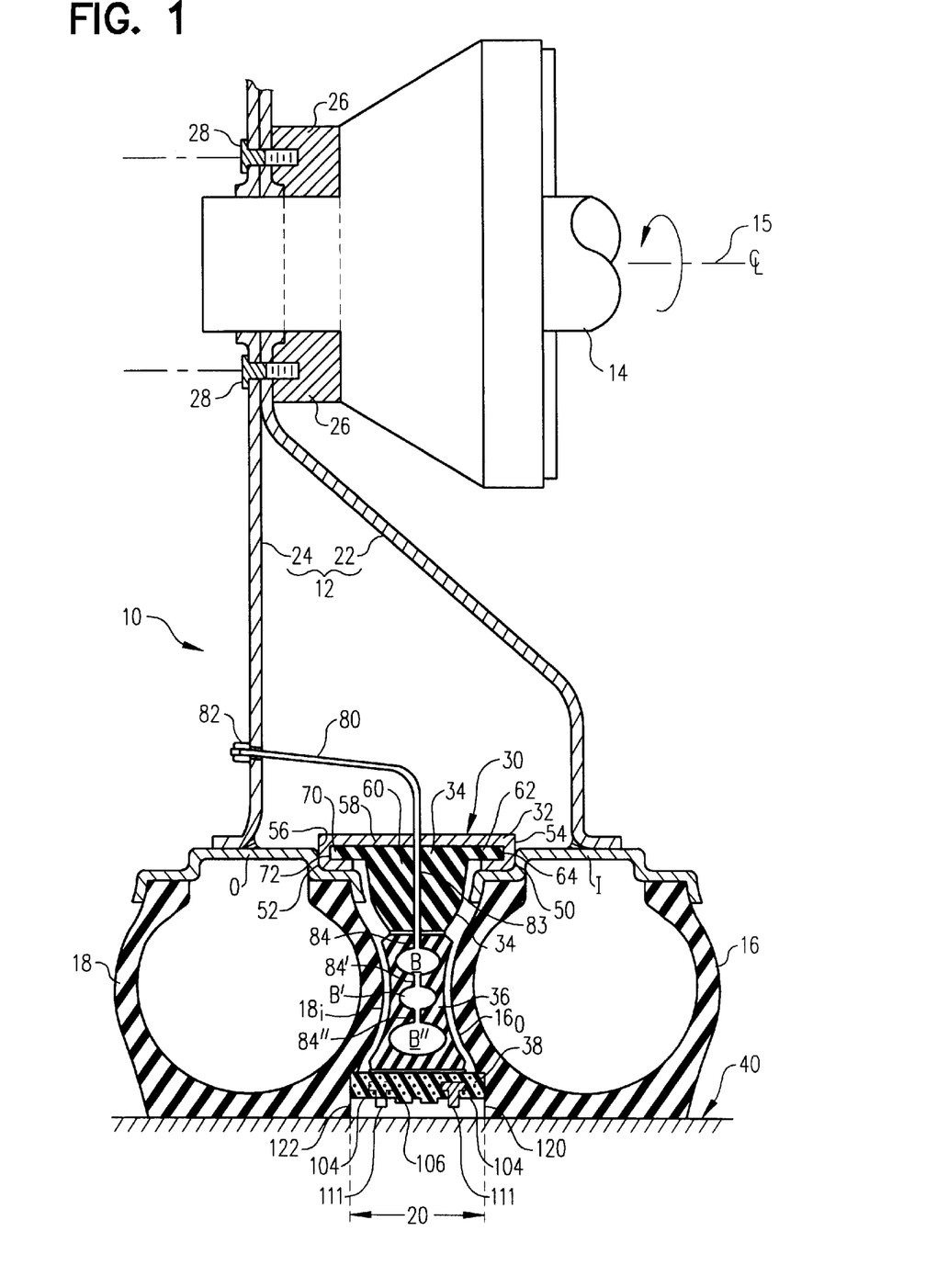
FIG. 1 is a vertical, partial cross-sectional view of a dual wheel set for a vehicle with my retractable stud device thereon, showing a pair of tires, located therebetween, my retractable stud apparatus with the preferably metal retaining ring at the top, a resilient rubber spacer ring therebelow, an inflation ring, and the tread ring at the bottom, between tires, in the uninflated position.

Attention is directed to FIG. 1 of the drawing, where a partial cross-sectional view is provided, showing the bottom half of a wheel assembly 10. The wheel assembly 10 includes a wheel 12 which rotates, on axle 14, about a central axis of rotation 15. A first tire 16 and a second tire 18 are mounted to the wheel 12 in an outwardly spaced apart relationship along the axis of rotation 15. This provides, between first tire 16 and second tire 18, a centrally located mounting space 20 which is located radially outward from the axis of rotation. More preferably, an inner rim assembly 22 and an outer rim assembly 24 are affixed to mounting flange 26 by any desired method, such as mounting bolts 28. At the peripheral reaches of inner rim assembly 22 is an inner mounting rim I, and at the peripheral reaches of outer rim assembly 24 is an outer mounting rim O. The first tire 16 is affixed to inner mounting rim I, and the second tire 18 is affixed to outer mounting rim O. In this configuration, the mounting space 20 effectively extends radially outward from between mounting rims I and O, between the outer wall 16o of first tire 16 and the inner wall 18i of the second tire 18.

Figure 2:
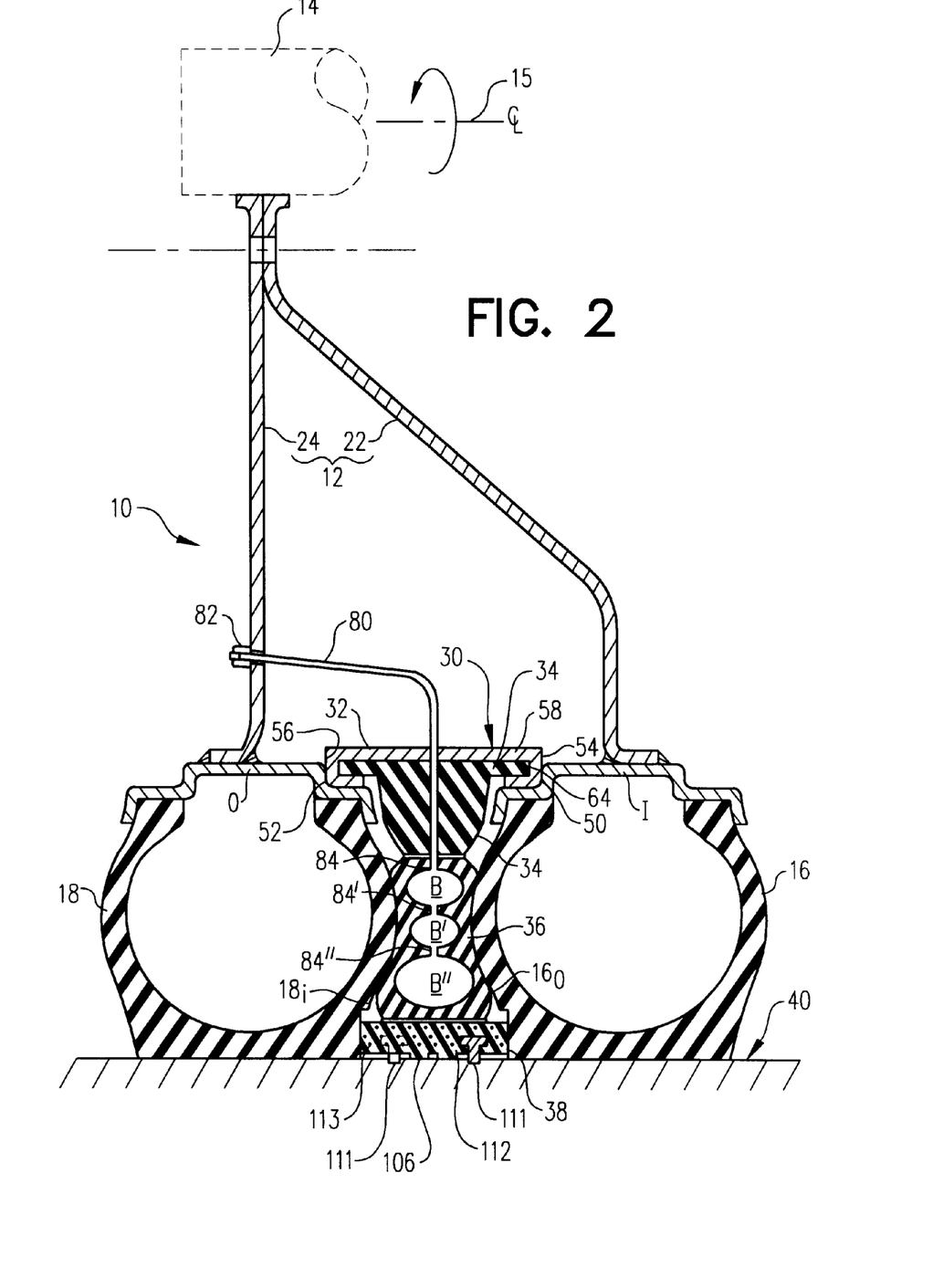
FIG. 2 is also a vertical, partial cross-sectional view of my dual wheel retractable stud tread device, similar to the view first shown in FIG. 1, but now showing the inflating ring in the inflated condition, and the tread ring extended radially outward so that the studs and anti-skid tread now engage the road surface.

Anti-skid device 30 is located in the mounting space 20 between the first tire 16 and the second tire 18. The anti-skid device 30 comprises, in radially outward order, (a) a retainer ring 32, (b) a spacer ring 34, (c) an inflation ring 36, and (d) an anti-skid tread ring 38. Each of the spacer ring 34, inflation ring 36, and anti-skid ring 38 may be made of suitable rubber compositions or other elastomeric substances such as polyurethane, but it is anticipated that compounds similar to those utilized for tires in usual service for the typically winter conditions encountered would be desirable. Special attention should be paid to composition for the inflation ring 36, to allow it to reliably expand and contract as it is inflated and deflated. The inflation ring 36 has at least one inflatable bladder B and preferably two or more inflatable bladders B, and more preferably three or more inflatable bladders B. The bladders B enable the inflation ring 36 to be displaceable, substantially radially, between (a) an uninflated position, indicated in FIG. 1, wherein the anti-skid tread ring 38 is inwardly radially withdrawn, with respect to the axis of rotation 15 (thus disengaging said anti-skid tread ring from a slippery surface 40 therebelow), and (b) an inflated position, indicated in FIG. 2, wherein the anti-skid tread ring 38 is outwardly radially extended with respect to said axis of rotation 15, thus positioning the anti-skid tread ring 38 adjacent the slippery surface 40.

To secure the anti-skid device 30, the inner rim 22 of wheel 12 has an outer upper retaining lip 50, and the outer rim 24 has an inner upper retaining lip 52. The retainer ring 32 is preferably configured in a wide, downwardly opening C-shape, with an inner retaining cap portion 54 at one end of the "C", an outer retaining cap portion 56 at the other end of the "C", and a central stay portion 58 between the inner retaining cap portion 54 and the outer retaining cap portion 56. The retainer ring 32 is firmly and securely mechanically positioned, during mounting of the wheel assembly 10, between the outer upper retaining lip 50 and the inner upper retaining lip 52.

The spacer ring 34 preferably includes an upper, generally T-shaped attachment portion 60. Of course, the top of the "T" forms a hoop as it extends circumferentially around and outwardly from retainer 32. The attachment portion 60 is adapted for being detachably affixed to the retainer ring 32. The attachment portion includes a first arm 62 sized and shaped for snug interfitting retention in the interior 64 of inner retaining cap portion 54 of the retainer ring 32. A second arm 70 is sized and shaped for snug interfitting retention in the interior 72 of outer retaining cap portion 52 of retainer ring 32.

My anti-skid apparatus is ideally employed when the first tire 16 and second tire 18 are each pneumatically inflatable, and in such cases, pneumatic inflation of inflation ring 36 may be conveniently accomplished by a variety of methods. As illustrated in FIG. 1, an inlet line 80 is utilized to provide a gas tight passageway for entry of a pressurized gas from inlet valve 82 to (a) an spacer ring internal gas passageway 83, and (b) thence to an internal gas inlet line 84 within the inflation ring 36, and (c) then on to bladder B. Gas is further transferred to second bladder B' via internal gas inlet line 84', and to third bladder B" via internal gas inlet line 84".

Preferably, the first bladder B. optional bladder B', and optional third bladder B" are each integrally embedded within inflation ring 36. More preferably, the bladder B, B' and B" are integrally formed at time of manufacture of inflation ring 36 from a selected elastomeric material. In the preferred construction manner more clearly seen in FIG. 5, for example, the bladders B, B', and B" are located in an outward radial sequence along a lateral centerline 90 of inflation ring 36.

Figure 3:
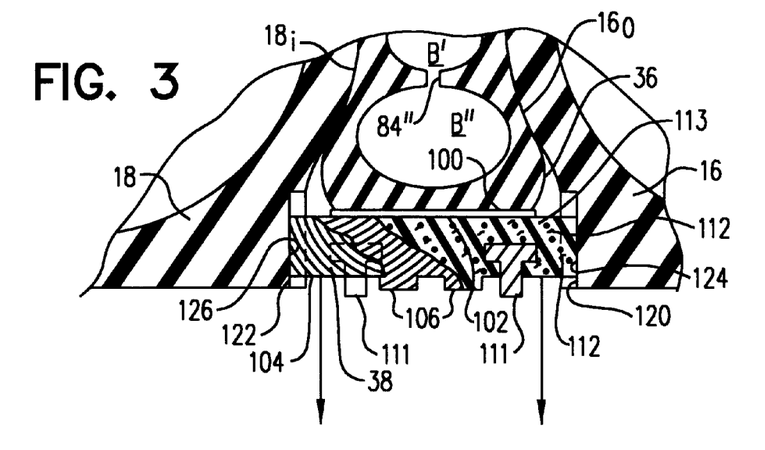
FIG. 3 is an exploded partial cross-sectional view of my retractable tread device, shown located between two tires, and with the inflation ring inflated to downwardly extend the anti-skid tread, and studs embedded therein, in order to engage a roadway below.
Figure 4:
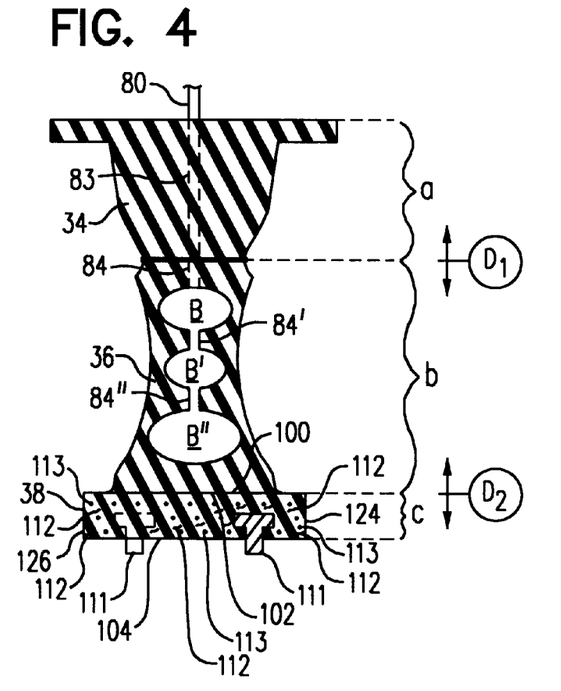
FIG. 4 is a vertical cross-sectional view of one embodiment of my device, showing an integrally fabricated unit with bonded/assembled spacer ring, inflation ring, and tread ring with anti-skid surface thereon.
Figure 5:
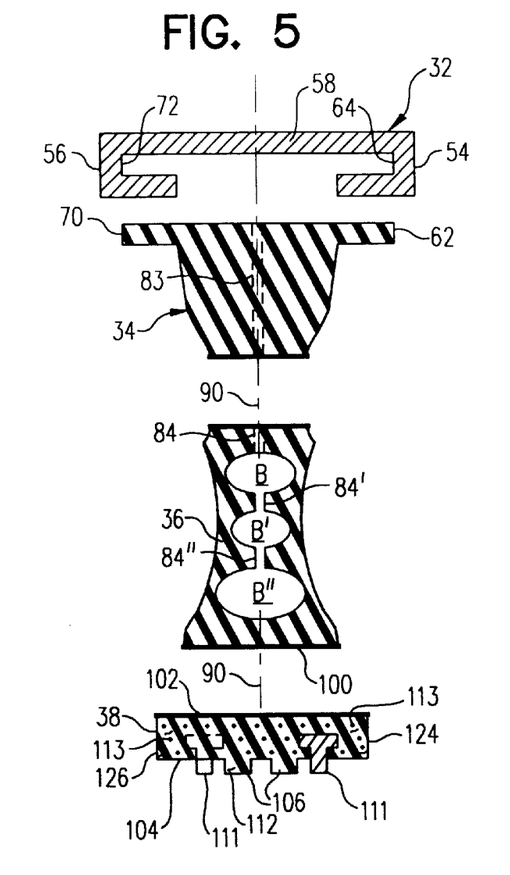
FIG. 5 is a vertical cross-sectional view of a second embodiment of my anti-skid device, showing an assembled unit with separately fabricated with separate spacer ring, inflation ring, and tread ring with anti-skid surface thereon.

As also seen more clearly in FIGS. 3, 4, and 5, the inflation ring further comprises a lower, tread ring support surface 100. The tread ring 38 is preferably provided in a hoop shaped ring, having an upper inflation ring engaging surface 102. The inflation ring engaging surface 102 is shaped and sized for close fitting engagement with the tread ring support surface 100 of the inflation ring 36. The tread ring 38 has at the radially outward reaches thereof a hoop shaped anti-skid tread surface 104. The anti-skid tread surface 104 is adapted to engage a slippery surface 40 so as to increase friction between the slippery surface 40 and the anti-skid ring 38. To increase friction, the anti-skid tread surface 104 is preferably provided with a plurality of traction increasing tread lugs 106 that are integrally formed with the tread surface 104, much as are provided in any conventional snow tire construction. T further increase traction provided by my anti-skid device 30, anti-skid studs 111 may be embedded within the tread surface 104, either additionally as indicated in FIG. 5, or alternately as indicated in FIG. 4. Also, in the compounding of the rubber or other elastomeric body of anti-skid ring 38, a hard, long wearing friction increasing particulate additive 112 can be utilized, such as crushed walnut shells or fine hard particles of plastic, metal, or mineral composition. In FIGS. 4 and 5, such friction increasing particles 112 are not to be confused with desirable strengthening cords 113 (such as fibre or steel) which provide the necessary circumferential strength to effectively control the radial expansion of anti-skid tread ring 38 upon inflation.

I have determined that my anti-skid device 30 may be provided in either an integral, one-piece construction from a single elastomeric part as indicated in FIG. 4, or may be formed in multiple parts as indicated in FIG. 5. Either way, a radially expandable traction increasing tread ring 38 is provided with a friction increasing outer tread surface 104 that is advantageously employed between dual tires 16 and 18 on wheel assembly 10.

Figure 7:
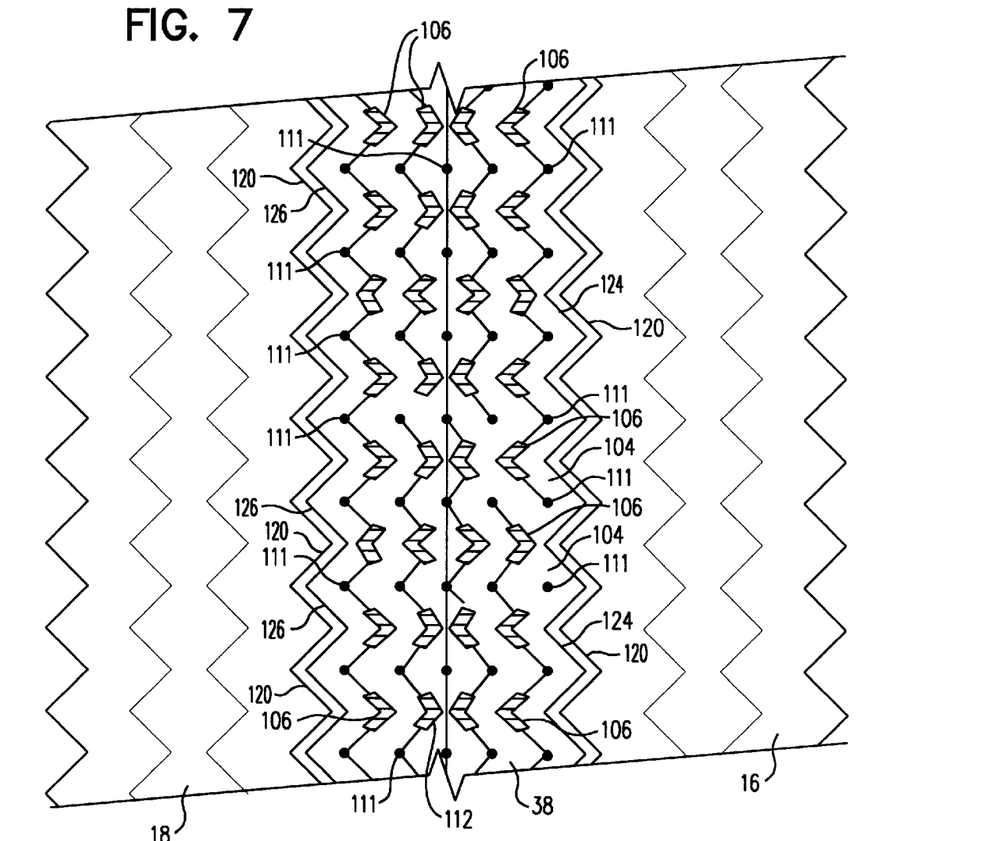
FIG. 7 is a plan view of the tread footprint of my retractable stud tread device, showing the preferred interlocking pattern between adjacent tire tread and the inflatable tread footprint, thereby precluding relative rotation therebetween.

One desirable "foot-print" for my anti-skid device 30 is indicated in FIG. 7, which illustrates the use of both tread lugs 106 and anti-skid studs 111 protruding from tread surface 104 of tread ring 38. When friction is increased between surface 40 and anti-skid tread ring 104, it becomes desirable to assure that the anti-skid device 30 does not slip as torque is applied from axle 14. One method of integrating the anti-skid device 30 with the tires 16 and 18 is to match the configuration of tires 16 and 18 with the anti-skid device 30, at their interface. In this manner, the first tire 16 is provided with an patterned portion 120 at its outer edge $16_i$, and the second tire 18 is provided with a patterned portion 122 at its inner edge $18_i$. The anti-skid tread has an inner edge patterned portion 124, and an outer edge patterned portion 126, which match, respectively, the patterned portion 120 of first tire 16, and the patterned portion 122 of second tire 18. The matching patterned edge interfaces (outwardly, (a) 120–124, and (b) 126–122) are provided in a size and shape such that the outer edge patterned portion 120 of the first tire 16 is interlockingly engageable with the inner edge patterned portion 124 of the anti-skid tread ring 38. Similarly, the inner edge patterned portion 122 of the second tire 18 is interlockingly engageable with the outer edge patterned portion 126 of the anti-skid tread ring 38. In this manner, the anti-skid tread ring 38 is effectively interlocked with the first tire 16 and with the second tire 18.

Figure 6:
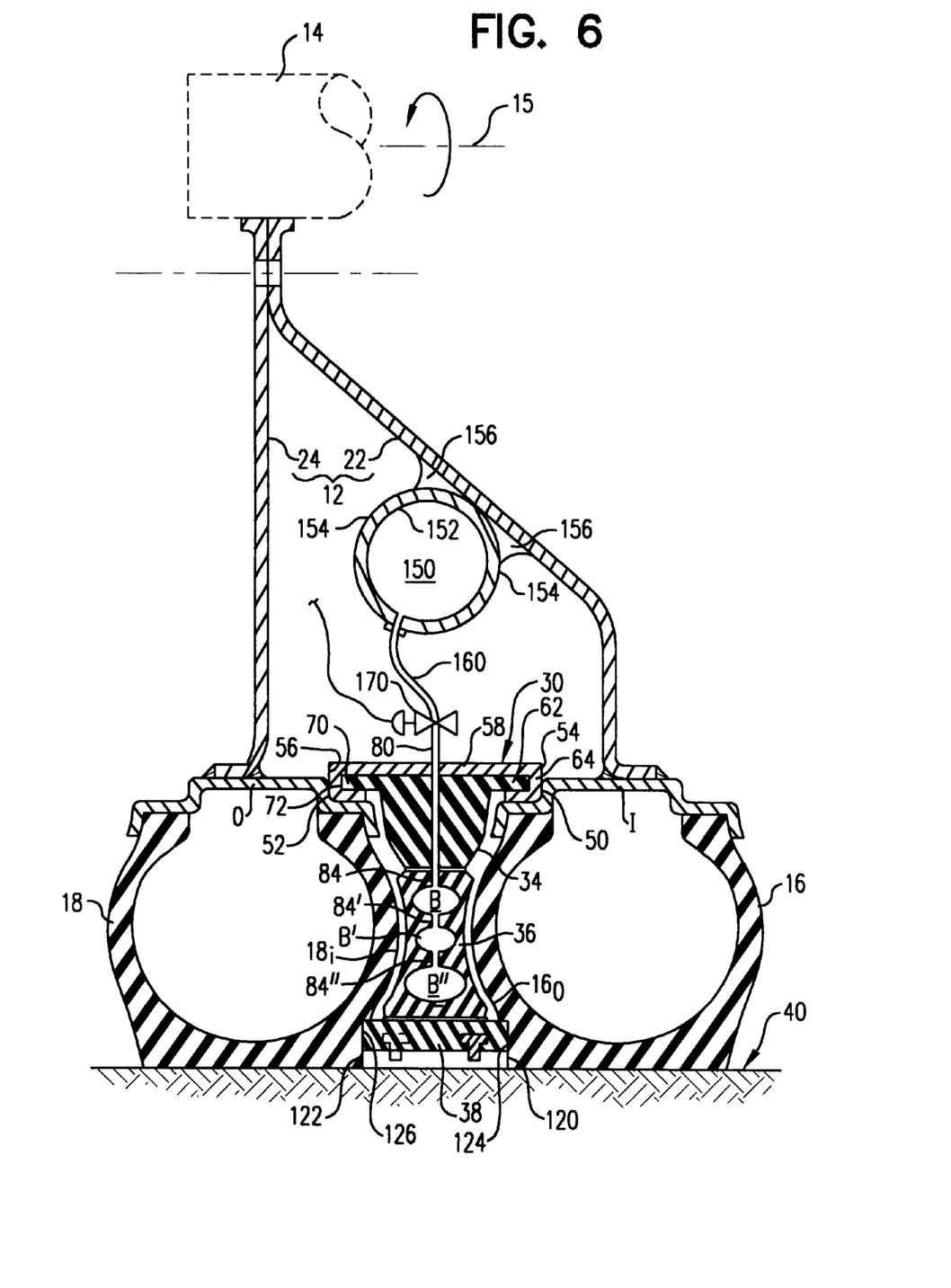
FIG. 6 is another embodiment of my retractable tread device for dual tires, similar to the device shown in FIG. 1 above, now showing the use of an integral wheel mounted gas container, here provided in a hollow ring or hoop shaped structure affixed to the interior surface of a wheel, to contain sufficient portable air supply for inflation of the device while either stationary or while rolling.
Figure 8:
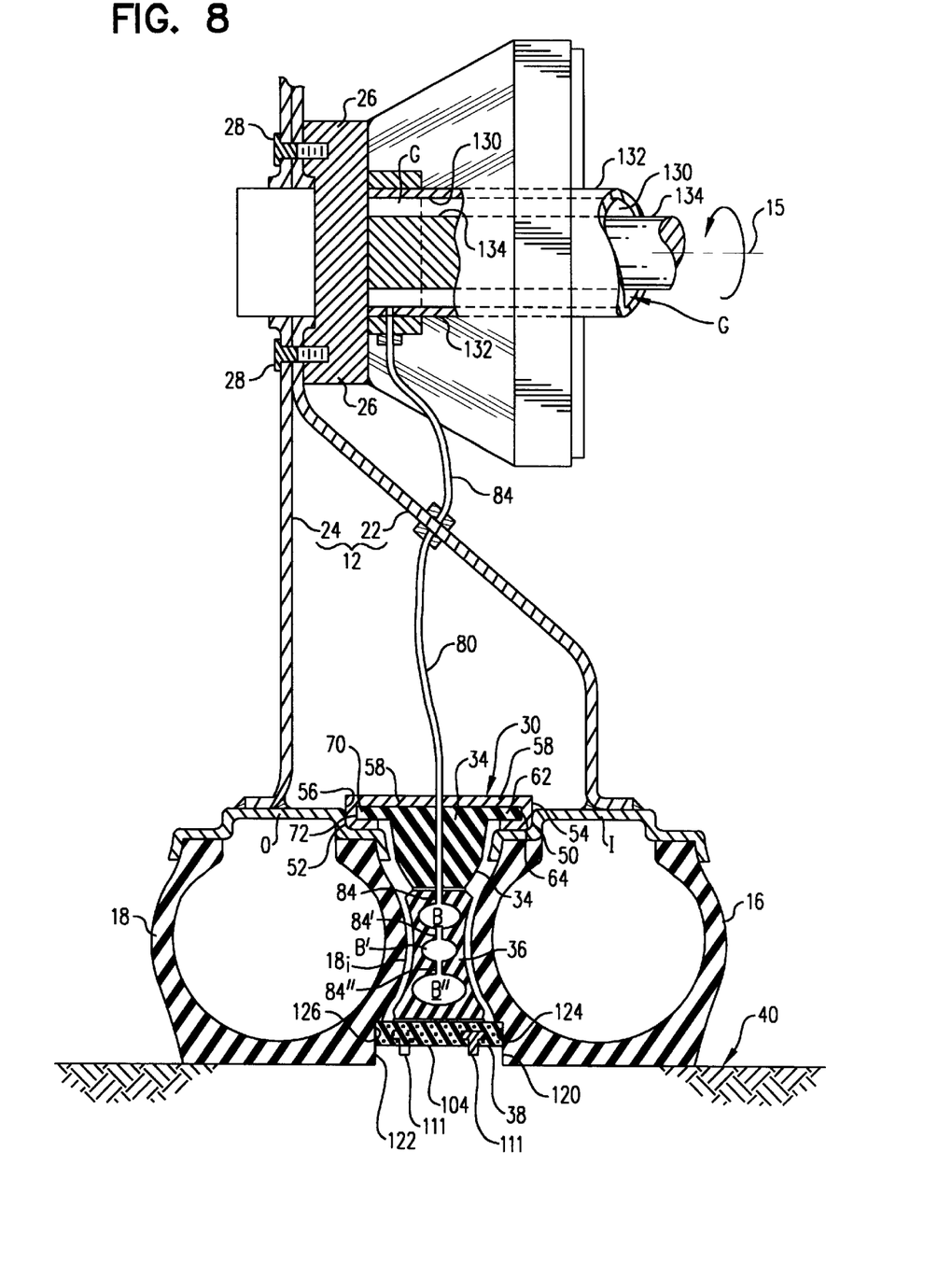
FIG. 8 is yet another embodiment of my retractable tread device for dual tires, similar to the device shown in FIG. 1 above, now showing the use of inflation gas supplied directly from a pressurized gas supply structure along the axle.
Figure 9:
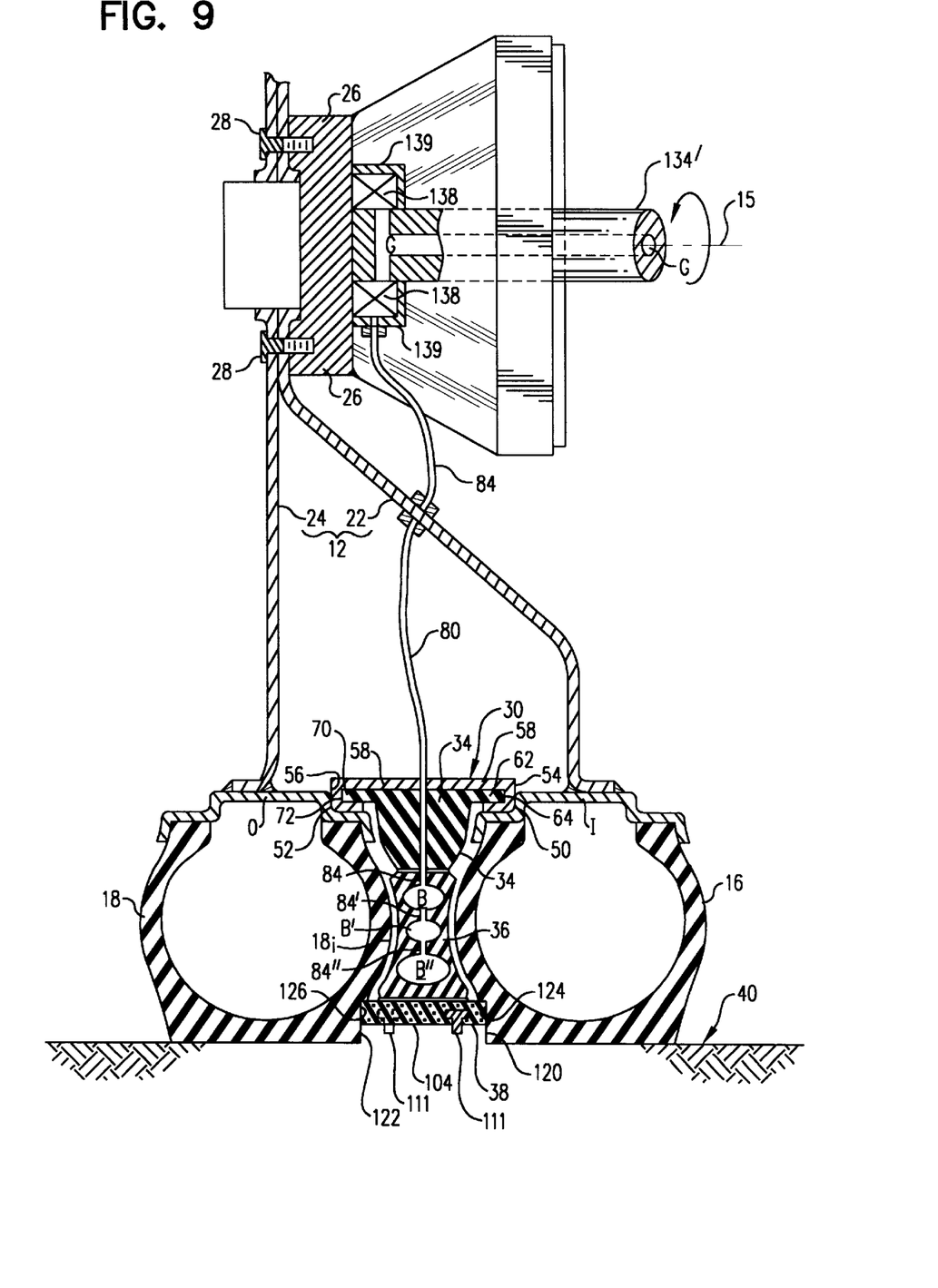
FIG. 9 is still another embodiment of my retractable tread device for dual tires, similar to the device shown in FIG. 8, now showing use of a hollow axle for supply of pressurized gas.

In FIG. 1 above, a simple manual inflation method was illustrated, where a pressurized inflation gas such as air or nitrogen can be inserted through inlet valve 82. However, it will be advantageous in certain circumstances to eliminate the need to stop and inflate my anti-skid device 30, and inflation of the device by way of self contained inflation gas chamber, as illustrated in FIG. 6. Alternately, as seen in FIG. 8, on-board pressurization techniques may be advantageously utilized. I prefer to provide pressurized gas through space G between inner wall 130 of stationary axle casing 132 and outer wall 134 of axle 136. The latter technique involves connecting to inlet line 80 an inlet extension line 84 that is affixed to axle casing 132 in a gas tight relationship. In this manner, the inflation ring 36 is inflatable or deflatable by adjustment of the pressure of a gas from the hollow, gas tight chamber G. In another embodiment as indicated in FIG. 9, pressurized gas can be supplied through a hollow rotating axle 134', which escapes through a rotatable connector 138 and seal 139 to inflation ring 38.

Alternately, as shown in FIG. 6, gas supply may be via a container on the wheel 12 itself. A hoop shaped, gas tight, tubular chamber 150 defined by interior walls 152 is affixed, preferably at is outer wall 154 by weldment 156, to the inner rim assembly 22 of wheel 12 for rotation therewith. An inlet line extension 160 is affixed in a gas tight relationship with said inlet line 80 and with the hoop shaped gas tight tubular chamber 150. A remotely controllable valve 170 is located to control release of pressurized gas from the interior of the chamber 150 to the inflation ring 36.

Figure 10:
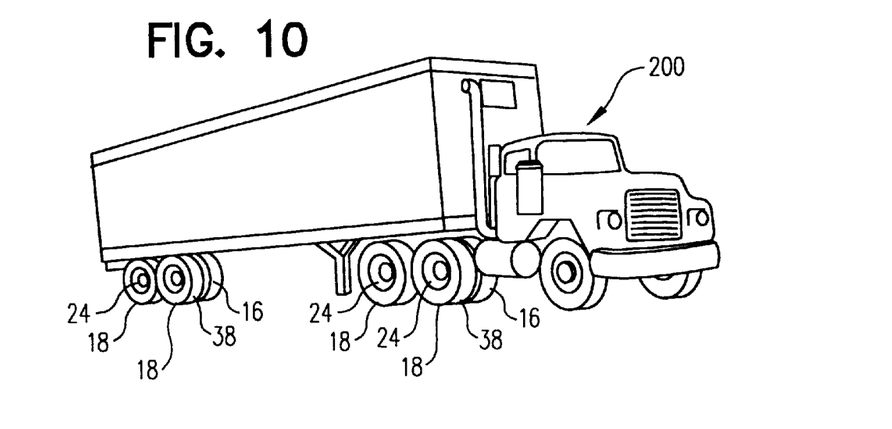
FIG. 10 is a perspective view of vehicle with eight sets of dual tired wheels, specifically indicating one vehicle type where the quick inflation and deflation of my novel anti-skid device would provide significant traction improvement with minimum loss of productivity of the vehicle.

The method of use of my anti-skid device 30 is quite straightforward. When encountering a slippery surface 40, a wheeled vehicle 200, such as an "18 wheeler truck" as shown in FIG. 10 equipped with the anti-skid device illustrated above, or one of the alternative configurations illustrated, adjusts the inflation ring(s) 36 from an uninflated position, wherein the anti-skid tread ring 36 is inwardly radially withdrawn, with respect to the axis of rotation 15 (and disengaged from the slippery surface 40), to an inflated position, wherein the anti-skid tread ring 36 is outwardly radially extended, with respect to the axis of rotation 15, thus positioning the anti-skid tread ring 36 to engage the slippery surface 40. Preferably, the method just described further includes the step of adjusting the inflation ring 36 is accomplished by remotely operating a valve 170, to allow a pressurized gas supply to inflate the inflation ring 36 to an inflated position. When extra traction is no longer needed, the remotely operated valve 170 is actuated to allow pressure to escape the inflation ring 36, allowing it to deflate and disengage surface 40. Alternately, the inflation and deflation can be accomplished by adjustment of pressure in chamber G as indicated in FIG. 8.

It is to be appreciated that the novel studded anti-skid device with retractable tread, as provided by the present invention, is an appreciable improvement in the state of the art of anti-skid devices for wheeled vehicles having dual tires on a wheel assembly. My novel device is relatively simple, and it substantially decreases the cost and complexity involved in providing an anti-skid apparatus for trucks, buses, and delivery vehicles. Although only a few exemplary embodiments of this invention have been described in detail, it will be readily apparent to those skilled in the art that my novel anti-skid device may be modified from those embodiments provided herein, without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein, and not only structural equivalents thereof, but also equivalent structures. Thus, the scope of the invention, as indicated by the appended claims rather than by the foregoing description, is intended to include variations from the embodiments provided which are nevertheless described by the broad meaning and range properly afforded to the language of the claims, or to the equivalents thereof.

I claim:

1. The combination of an anti-skid device and a wheeled vehicle, said combination for increasing friction between said wheeled vehicle and a slippery surface therebelow, said anti-skid device comprising:
    (a) a wheeled vehicle, said vehicle comprising at least one wheel assembly, each of said at least one wheel assemblies comprising
        (1) a wheel having a central axis of rotation,
        (2) a first tire,
        (3) a second tire,
        (4) and wherein said first tire and said second tire are mounted to said wheel in a spaced apart relationship along said axis of rotation, to provide therebetween a centrally located mounting space which is located radially outward from said central axis of rotation,
    (b) an anti-skid device, said anti-skid device located in said mounting space between said first tire and said second tire, said anti-skid device comprising, in radially outward order,
        (1) a retainer ring,
        (2) a spacer ring,
        (3) an inflation ring, and
        (4) an anti-skid tread ring.

2. The apparatus as set forth in claim 1, wherein said inflation ring further comprises at least one inflatable bladder, said inflation ring displaceable between
    (a) an uninflated position, wherein said anti-skid tread ring is inwardly radially withdrawn, with respect to said axis of rotation, disengaging said anti-skid tread ring from said slippery surface, and
    (b) an inflated position, wherein said anti-skid tread ring is outwardly radially extended, with respect to said axis of rotation, positioning said anti-skid tread ring adjacent said slippery surface.

3. The apparatus as set forth in claim 1, wherein
    (a) said wheel further comprises
        (1) an inner rim with an outer upper retaining lip, and
        (2) an outer rim with an inner upper retaining lip;
    (b) said retainer ring further comprises
        (1) an inner retaining cap portion,
        (2) an outer retaining cap portion,
        (3) a central stay portion between said inner retaining cap portion and said outer retaining cap portion, and
    (c) wherein said retainer ring is firmly and securely mechanically positioned, during assembly of said wheel,
        (1) by said outer upper retaining lip, at said outer retaining cap portion of said retainer ring, and
        (2) by said inner upper retaining lip, at said inner retaining cap portion of said retainer ring.

4. The apparatus as set forth in claim 3, wherein said spacer ring further comprises an upper, generally T-shaped attachment portion, said attachment portion adapted for being detachably affixed to said retainer ring.

5. The apparatus as set forth in claim 4, wherein said T-shaped attachment portion comprises
   (a) a first arm, said first arm adapted for snug interfitting retention in said inner retaining cap portion of said retainer ring, and
   (b) a second arm, said second arm adapted for snug interfitting retention in said outer retaining cap portion of said retainer ring.

6. The apparatus as set forth in claim 2, wherein said first tire, said second tire, and said inflatable bladder in said inflation ring are each pneumatically inflatable.

7. The apparatus as set forth in claim 6, wherein said inflation ring comprises an annular ring assembly, said inflation ring further comprising an internal gas inlet line to allow entry of a pressurized gas into said at least one inflatable bladder.

8. The apparatus as set forth in claim 7, wherein said inflation ring includes a first and a second inflatable bladder, and wherein both said first and said second inflatable bladders are integrally embedded within said inflation ring.

9. The apparatus as set forth in claim 8, wherein said second inflatable bladder is located radially outward from said first inflatable bladder.

10. The apparatus as set forth in claim 2, wherein
    (a) said inflation ring further comprises a lower, tread ring support surface; and
    (b) said tread ring comprises a hoop shaped ring, having an upper inflation ring engaging surface, said inflation ring engaging surface shaped and sized for close fitting engagement with said tread ring support surface of said inflation ring.

11. The apparatus as set forth in claim 1, wherein said anti-skid ring comprises a hoop shaped tread surface, said hoop shaped tread surface comprising an anti-skid tread surface adapted to engage said slippery surface so as to increase friction between said slippery surface and said anti-skid ring.

12. The apparatus as set forth in claim 11, wherein said anti-skid ring further comprises anti-skid studs.

13. The apparatus as set forth in claim 11, wherein said anti-skid ring further comprises a hard, long wearing particulate, said particulate effective to increase traction between said slippery surface and said anti-skid ring.

14. The apparatus as set forth in claim 7, further comprising
    (a) an inlet line extension, said inlet line extension affixed in a gas tight relationship with said inlet line; and
    (b) an inlet valve, said inlet valve located at the distal end of said inlet line extension, said inlet valve configured for allowing manual insertion of gas therethrough for inflating said inflation ring.

15. The apparatus as set forth in claim 7, further comprising
    (a) an inlet line extension, said inlet line extension affixed in a gas tight relationship with said inlet line;
    (b) an axle, said having a hollow, gas tight chamber therein, said axle adapted for fixedly attaching said wheel assembly thereto for common rotary motion,
    (c) and wherein said inlet line extension and said gas tight chamber are affixed in a gas tight relationship, so that said inflation ring is inflatable or deflatable by adjustment of the pressure of a gas located in said hollow, gas tight chamber of said axle.

16. The apparatus as set forth in claim 7, further comprising
    (a) a hoop shaped gas tight tubular chamber, said chamber affixed to said wheel for rotation therewith; and
    (b) an inlet line extension, said inlet line extension affixed in a gas tight relationship with said inlet line and with said hoop shaped gas tight tubular chamber, and
    (c) a remotely controllable valve, said valve located to control release of pressurized gas from said hoop shaped gas tight tubular chamber to said inflation ring.

17. The apparatus as set forth in claim 1, wherein said spacer ring, said inflation ring, and said anti-skid tread ring comprise an integral, one-piece anti-skid assembly.

18. The apparatus as set forth in claim 1, wherein
    (a) said first tire further comprises an outer edge patterned portion, and
    (b) said second tire further comprises an inner edge patterned portion,
    (c) said anti-skid tread further comprises an inner edge patterned portion, and
    (d) said anti-skid tread further comprises an outer edge patterned portion, and
    (e) wherein said outer edge patterned portion of said first tire is interlockingly engageable with said inner edge patterned portion of said anti-skid tread, and
    (f) wherein said inner edge patterned portion of said second tire is interlockingly engageable with said outer edge portion patterned portion of said anti-skid tread,
    (g) so that said anti-skid tread is effectively interlocked with said first tire and with said second tire.

19. The combination of an anti-skid device and a wheeled vehicle, said combination for increasing friction between said wheeled vehicle and a slippery surface therebelow, said anti-skid device comprising:
    (a) a wheeled vehicle, said vehicle comprising two or more dual tire type wheel assemblies, each of said at least two or more dual tire type wheel assemblies comprising
        (1) a wheel having a central axis of rotation,
        (2) a first tire,
        (3) a second tire,
        (4) and wherein said first tire and said second tire are mounted to said wheel in a spaced apart relationship along said axis of rotation, to provide therebetween a centrally located mounting space which is located radially outward from said central axis of rotation,
    (b) an anti-skid device, said anti-skid device located in said mounting space between said first tire and said second tire, said anti-skid device comprising, in radially outward order,
        (1) a retainer ring,
        (2) a spacer ring,
        (3) an inflation ring, pneumaticaly inflatable, and
        (4) an anti-skid tread ring.

20. The apparatus as set forth in claim 1, wherein said inflation ring further comprises at least one inflatable bladder, said inflation ring displaceable between
    (a) an uninflated position, wherein said anti-skid tread ring is inwardly radially withdrawn, with respect to said axis of rotation, disengaging said anti-skid tread ring from said slippery surface, and
    (b) an inflated position, wherein said anti-skid tread ring is outwardly radially extended, with respect to said axis of rotation, positioning said anti-skid tread ring adjacent said slippery surface.

21. A method of increasing the friction between a wheeled vehicle and a slippery surface therebelow, said wheeled vehicle of the type comprising two or more dual tire type wheel assemblies, said method comprising
  (a) providing wheel assemblies comprising
    (1) a wheel having a central axis of rotation,
    (2) a first tire,
    (3) a second tire,
    (4) and wherein said first tire and said second tire are mounted to said wheel in a spaced apart relationship along said axis of rotation, to provide therebetween a centrally located mounting space which is located radially outward from said central axis of rotation, and
  (b) providing an anti-skid device, said anti-skid device located in said mounting space between said first tire and said second tire, said anti-skid device comprising, in radially outward order,
    (1) a retainer ring,
    (2) a spacer ring,
    (3) an inflation ring, pneumaticaly inflatable, and
    (4) an anti-skid tread ring,
  (c) adjusting said inflation ring between
    (1) an uninflated position, wherein said anti-skid tread ring is inwardly radially withdrawn, with respect to said axis of rotation, disengaging said anti-skid tread ring from said slippery surface, and
    (2) an inflated position, wherein said anti-skid tread ring is outwardly radially extended, with respect to said axis of rotation, positioning said anti-skid tread ring adjacent said slippery surface.

22. The method as set forth in claim 21, wherein the step of adjusting said inflation ring is accomplished by remotely operating a valve, said valve controlling a gas supply and positionable between an inflate position, wherein gas is supplied to inflate said inflation ring to the inflated position, and a deflate position, wherein said gas is allowed to escape from said inflation ring.

23. The method as set forth in claim 21, wherein said anti-skid device further comprises a plurality of anti-skid pins, said anti-skid pins implanted in said tread of said anti-skid device and projecting radially outward therefrom.

24. A dual wheel assembly including an anti-skid device, said apparatus comprising:
  (a) at least one dual wheel assembly, said at least one dual wheel assembly comprising
    (1) a dual wheel having a central axis of rotation,
    (2) a first tire,
    (3) a second tire,
    (4) and wherein said first tire and said second tire are mounted to said wheel in a spaced apart relationship along said axis of rotation, to provide therebetween a mounting space;
  (b) an anti-skid device, said anti-skid device located in said mounting space, said anti-skid device comprising, in outward order,
    (1) a retainer ring,
    (2) a spacer ring,
    (3) an inflation ring, and
    (4) an anti-skid tread ring.

25. An anti-skid device for use with a dual wheel assembly having a pair of tires mounted about a rim in a spaced apart configuration, said device comprising, in a radially outward order,
  (a) a retainer ring, said retainer ring mounted adjacent said rim,
  (b) a spacer ring,
  (c) an inflation ring, and
  (d) an anti-skid tread ring.

26. The apparatus as set forth in claim 24 or 25, wherein said inflation ring further comprises at least one inflatable bladder, said inflation ring displaceable between
  (a) an uninflated position, wherein said anti-skid tread ring is inwardly radially withdrawn, with respect to said axis of rotation, disengaging said anti-skid tread ring from said slippery surface, and
  (b) an inflated position, wherein said anti-skid tread ring is outwardly radially extended, with respect to said axis of rotation, positioning said anti-skid tread ring adjacent said slippery surface.

27. The apparatus as set forth in claim 24 or claim 25, wherein said spacer ring further comprises an upper, generally T-shaped attachment portion, said attachment portion adapted for being detachably affixed to said retainer ring.

28. The apparatus as set forth in claim 27, wherein said T-shaped attachment portion comprises
  (a) a first arm, said first arm adapted for snug interfitting retention in said inner retaining cap portion of said retainer ring, and
  (b) a second arm, said second arm adapted for snug interfitting retention in said outer retaining cap portion of said retainer ring.

29. The apparatus as set forth in claim 26, wherein each of said inflatable bladders in said inflation ring are each pneumatically inflatable.

30. The apparatus as set forth in claim 29, wherein said inflation ring comprises an annular ring assembly, said inflation ring further comprising an internal gas inlet line to allow entry of a pressurized gas into said at least one inflatable bladder.

31. The apparatus as set forth in claim 26, wherein said inflation ring includes a first and a second inflatable bladder, and wherein both said first and said second inflatable bladders are integrally embedded within said inflation ring.

32. The apparatus as set forth in claim 24 or claim 25, wherein
  (a) said inflation ring further comprises a tread ring support surface; and
  (b) said tread ring comprises a hoop shaped ring, having an inflation ring engaging surface, said inflation ring engaging surface shaped and sized for close fitting engagement with said tread ring support surface of said inflation ring.

33. The apparatus as set forth in claim 24 or claim 25, wherein said anti-skid ring comprises a hoop shaped tread surface, said hoop shaped tread surface comprising an anti-skid tread surface adapted to engage a slippery surface so as to increase friction between a slippery surface and said anti-skid ring.

34. The apparatus as set forth in claim 33, wherein said anti-skid ring further comprises anti-skid studs.

35. The apparatus as set forth in claim 33, wherein said anti-skid ring further comprises a hard, long wearing particulate, said particulate effective to increase traction between said slippery surface and said anti-skid ring.

36. The apparatus as set forth in claim 24 or claim 25, wherein said spacer ring, said inflation ring, and said anti-skid tread ring comprise an integral, one-piece anti-skid assembly.

37. The apparatus as set forth in claim 24, wherein
(a) said first tire further comprises an outer edge patterned portion, and
(b) said second tire further comprises an inner edge patterned portion,
(c) said anti-skid tread further comprises an inner edge patterned portion, and
(d) said anti-skid tread further comprises an outer edge patterned portion, and
(e) wherein said outer edge patterned portion of said first tire is interlockingly engageable with said inner edge patterned portion of said anti-skid tread, and
(f) wherein said inner edge patterned portion of said second tire is interlockingly engageable with said outer edge portion patterned portion of said anti-skid tread,
(g) so that said anti-skid tread is effectively interlocked with said first tire and with said second tire.

* * * * *